United States Patent [19]

Louvar et al.

[11] 4,137,396

[45] Jan. 30, 1979

[54] FILTRATION PROCESS FOR PURIFYING POLYOLS

[75] Inventors: Joseph F. Louvar, Lincoln Park; Michael A. Capraro, Southgate; William M. Herring, Trenton, all of Mich.

[73] Assignee: BASF Wyandotte Corporation, Wyandotte, Mich.

[21] Appl. No.: 829,436

[22] Filed: Aug. 31, 1977

Related U.S. Application Data

[63] Continuation-in-part of Ser. No. 726,122, Sep. 24, 1976, abandoned.

[51] Int. Cl.$^2$ .................. C07H 3/06; C07C 41/12
[52] U.S. Cl. .................. 536/4; 568/621; 568/608; 568/620; 260/571; 260/573; 260/584 B; 260/570 D; 536/120; 544/398; 544/401; 544/383
[58] Field of Search ............ 260/611 B, 613 B, 615 B, 260/616, 268, 571, 573, 584 B; 536/4, 120; 544/398, 401, 383

[56] References Cited

U.S. PATENT DOCUMENTS

| 2,496,582 | 2/1950 | Engeart | 260/611 X |
|---|---|---|---|
| 2,733,272 | 1/1956 | Horseley et al. | 260/615 B |
| 3,356,738 | 12/1967 | Hauser et al. | 260/615 B |
| 3,715,402 | 2/1973 | Louvar et al. | 260/615 B |
| 3,823,145 | 7/1974 | Louvar et al. | 260/615 B |

FOREIGN PATENT DOCUMENTS

| 4532432 | 10/1970 | Japan | 260/615 B |
|---|---|---|---|
| 197158 | 7/1967 | U.S.S.R. | 260/615 B |

*Primary Examiner*—Howard T. Mars
*Attorney, Agent, or Firm*—Andrew E. Pierce; Bernhard R. Swick; Robert E. Dunn

[57] ABSTRACT

An improvement in the process for the removal of residual catalyst from polyether polyols is achieved by the use of a solvent wash and recovery system.

8 Claims, 1 Drawing Figure

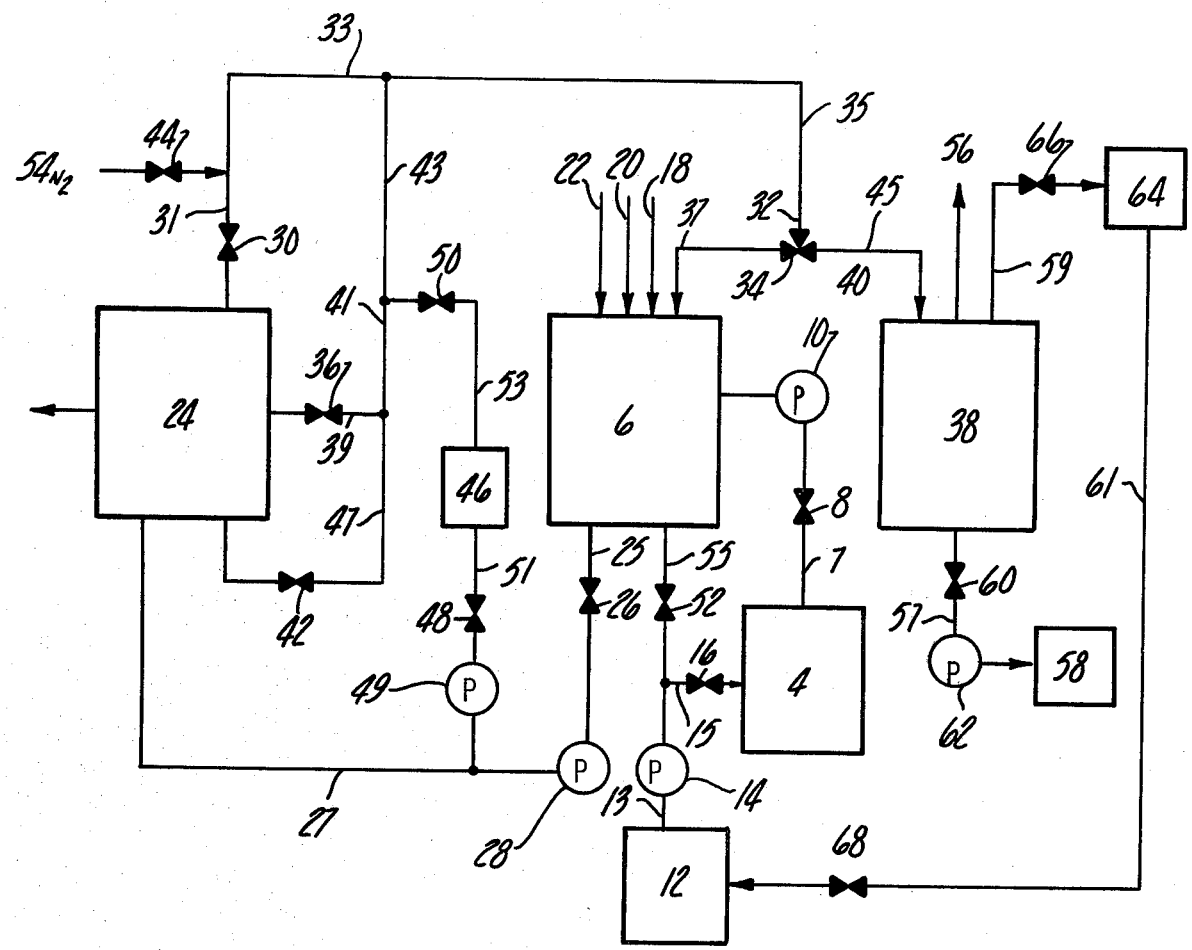

FILTRATION PROCESS FOR PURIFYING POLYOLS

This application is a continuation-in-part of the application filed Sept. 24, 1976, Ser. No. 726,122, now abandoned.

BACKGROUND OF THE INVENTION

1. Field of the Invention

Polyoxyalkylene ether polyols, hereinafter for convenience called polyols, are commonly used in the production of urethane polymers. These polyols are reacted with polyisocyanate in the presence of added catalyst and other materials to produce urethane polymers which may be in the form of rubber-like elastomers, flexible or rigid foams and the like. In order that urethane polymers of desired properties and characteristics be produced, it is important that the polyols to be reacted with the polyisocyanate are essentially free of impurities which may function as undesirable catalysts or otherwise in the urethane polymer reaction.

Polyols, as commercially prepared, contain in the crude form various impurities such as alkali metal hydroxide, or other metal salts which were employed as catalysts for the production of polyols. The normal concentrations of catalysts range from 1700 to 4000 parts per million. It is desirable to reduce this to a level of about 5 parts per million or less.

2. Prior Art

Present commercial practices for the removal of these impurities can involve neutralization of the salts of acids forming insoluble salts and removal of same by filtration. Centrifugation, employing mixtures of polyol, water, and solvent can also be employed for the removal of residual catalyst. Ion exchange techniques have also been employed for the removal of catalysts.

The crude polyols without prior neutralization of the catalyst can be treated with a synthetic type adsorbent followed by filtration of the polyol. Present commercial practice involves mixing the polyol, adsorbent, water and optionally a filter aid then filtering off the polyol. The resulting adsorbent contains an amount of polyol equal to at least its own weight. The disposal of this spent adsorbent presents both ecological and safety problems. Generally, the polyols are not biodegradable and disposal in a landfill is not desirable. The wet adsorbent, if allowed to remain exposed to the atmosphere, becomes pyrophoric and creates a safety hazard. The loss of polyol results in increased product costs.

U.S. Pat. No. 3,433,816 teaches a process for separating mother liquor from a filter cake by employing a solvent. The prior art does not teach a process for the employment of a solvent to remove a polyol from a filter cake of synthetic aluminum silicate without removal of the adsorbed catalyst.

U.S. Pat. Nos. 2,425,845 and 2,448,664 teach neutralization of the alkaline catalyst with an acid followed by hot filtration for the removal of the residual catalyst.

There is no teaching in the prior art of the process of the instant invention.

SUMMARY OF THE INVENTION

It has been discovered that the process of catalyst removal from polyols can be improved by employing certain solvents to remove the polyol retained on a magnesium silicate filter cake without removal of the adsorbed catalyst.

BRIEF DESCRIPTION OF THE DRAWING

The drawing illustrates a flow diagram of the polyol purification process, specifically the filtration cycle and the solvent recovery system.

DESCRIPTION OF THE PREFERRED EMBODIMENT

The improved process for the removal of residual catalysts from polyols involves the use of dry cake discharge type leaf filters with heel scavenging capabilities and the use of a solvent wash and recovery system wherein the entire system may be washed free of polyol.

The present invention can best be described by reference to the attached drawing. In the drawing a batch of crude polyol is transferred from reactor 4 to hold tank 6 via line 7 and valve 8 employing pump 10. Reactor 4 is then spray washed with solvent from solvent decanter storage tank 12 via lines 13 and 15 employing pump 14 and valve 16. The washings are then transferred to hold tank 6 via line 7 and valve 8 employing pump 10 cleaning out the transfer lines as well. Adsorbent 18, water 20, and optionally filter aid 22 are added to the polyol and the mixture is stirred from about one to about five hours at a temperature range of about 30° Centigrade to about 120° Centigrade until adsorption of the catalyst is complete. The mixture is transferred to leaf filter 24 via lines 25 and 27 through valve 26 employing pump 28 and allowed to fill and overflow filter 24 with the excess flowing back to hold tank 6 through valves 30, 32, and 34 via lines 31, 33, 35 and 37. When filter 24 is full valves 30 and 32 are closed, valve 36 is opened and the mixture is cycled through filter 24 until sufficient filter cake is deposited on filter 24 to achieve a clear, catalyst free filtrate of the polyol. The polyol is filtered through filter 24 and then transferred to flash stripper 38 via valves 36, 32, and 40 through lines 39, 41, 35 and 45 after valve 34 is closed. The remaining filter heel, which is that portion of the crude polyol batch which cannot be readily filtered through the leaf filter, is blown back to hold tank 6 through valves 42, 32, and 34 employing lines 47, 41, 43, 35, and 37 via nitrogen pressure through valves 44 and 30. Valves 44, 30 and 40 are closed and the heel is then pumped through scavenger system 46 through valves 48 and 50 by means of pump 49 employing lines 27, 51, and 53 until a clarified heel is obtained. The scavenger system 46 is one which is designed to purify the filter heel. It is generally a miniature version of a full scale leaf filter. The clarified heel is then transferred to flash stripper 38 via valves 50, 32 and 40 and transfer lines 53, 43, 35, and 45 after valve 34 is closed. Solvent from solvent decanter storage tank 12 is pumped through valve 52 via lines 13 and 55 washing out hold tank 6. The washings are pumped through filter 24 via valve 26, transfer lines 25, 27 employing pump 28 and then circulated back to hold tank 6 via valves 36, 32, and 34 and through valves 42, 32 and 34 via transfer lines 41, 43, 35, and 37. These washings are then circulated through scavenger system 46 via valves 48 and 50 using transfer lines 27, 51, and 53, then returned to flash stripper 38 via valves 50, 32 and 40 employing transfer lines 53, 43, 35 and 45 after valve 34 is closed. Valve 36 is then opened. Nitrogen gas 54 is passed through valves 44, 30, 36, 32 and 40 drying the filter cake and filter 24. The vapors are carried to flash stripper 38 in a manner similar to the washings. Excess pressure in flash stripper 38 is relieved through relief valve 56. The polyol in flash stripper 38 is then stripped of water and solvent, and transferred to polyol storage tank 58 via valve 60 through transfer line 57 employing pump 62. Solvent and water are stripped from the polyol employing solvent recovery system 64 via valve 66 and transfer line 59. The solvent is subsequently transferred to solvent recovery storage tank 12 via valve 68 and transfer line 61. The dried filter cake is then discharged from filter 24.

In general, the impurities present in the polyol which must be removed are catalysts used in the preparation of the polyol. These catalysts are generally alkali metal hydroxides or alkali metal alkoxides such as sodium hydroxide, potassium hydroxide, sodium alkoxide, potassium alkoxide, and so forth. Additional catalysts which may be employed in the preparation of such polyols and which may be removed by the instant process include the hydroxides and alkoxides of lithium or rubidium and cesium.

Generally speaking, the polyols purified in accordance with the present invention include those polyols prepared by condensing monomeric units such as ethylene oxide, propylene oxide, butylene oxide, and mixtures thereof with active hydrogen compounds such as ethylene glycol, propylene glycol, water, dipropylene glycol, trimethylene glycol, 1,2-butanediol, 1,3-butanediol, 1,4-butanediol, hexanetriol, glycerol, trimethylolpropane, trimethylolethane, hydroquinone, pentaerythritol, alpha-methylglucoside, sorbitol, sucrose, ethylene diamine, diethylene triamine, toluene diamine, aniline, methylene dianiline, piperazine, triisopropanolamine, and bisphenol A wherein these polyols have a molecular weight range from about 300 to about 26,000.

Included are those polyols which are characterized as being essentially hydroxyl terminated polyether polyols which have the general formula:

$$H(OR)_nOH$$

wherein R is an alkylene radical and n is an integer which in a preferred embodiment is sufficiently large that the compound, as a whole, has a molecular weight from about 300 to about 26,000. These would include polyoxyethylene glycol, polyoxypropylene glycol, polyoxybutylene glycol, and polytetramethylene glycol. Other typical polyols include block copolymers, e.g., combinations of polyoxypropylene and polyoxyethylene glycols, more specifically those having the general formula:

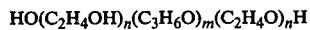

$$HO(C_2H_4OH)_n(C_3H_6O)_m(C_2H_4O)_nH$$

wherein n and m are together sufficient for attainment of the desired minimum molecular weight, that is, about 300. Also included are copolymers of poly-1,2-oxybutylene and polyoxyethylene glycols and poly-1,4-oxybutylene and Polyoxypropylene glycols and random copolymer glycols prepared from blends of sequential addition of two or more alkylene oxides as well as glycols as described above capped with the ethylene oxide units. The polyols purified in accordance with this invention can contain arylene or cycloalkylene radicals together with the alkylene radicals. In such products the cyclic groups inserted in a polyether chain are preferably phenylene, naphthalene, or cyclohexylene radicals or those radicals containing alkyl or alkylene substituents as in the tolylene, phenylethylene or xylylene radicals.

The adsorbents which may be employed in the practice of this invention are those which will remove the alkaline catalysts. Preferred are the synthetic magnesium silicate adsorbents. These synthetic adsorbents may be prepared by the reaction of a magnesium salt such as magnesium sulfate with sodium silicate. The resulting products can have particle sizes ranging from 5 to 500 microns with an average particle size of about 100–200 microns. These adsorbents are sold under trademarks of "BRITE SORB" by Philadelphia Quartz Corporation, and "MAGNESOL" by Reagent Chemicals. The amount of adsorbent which can be employed depends on the concentration of catalyst present in the polyol. Thus, amounts ranging from about 0.1 percent to about 5 percent by weight based on the weight of the polyol may be employed. Preferably, however, the concentration of adsorbent ranges from about 1.0 percent to about 3.0 percent based on the weight of polyol. From an economical point of view it is preferable to use as little as possible of the adsorbent.

A filter aid may be employed in addition to the magnesium silicate adsorbent, however, this may not be necessary if the screen size on the leaf filter is sufficient to retain the magnesium silicate adsorbent. It is contemplated that any suitable leaf filter may be employed in the practice of this invention. It is especially desirable that the filter have internal heel scavenging capabilities, thus eliminating the need for an external scavenger system as was illustrated.

Among the solvents which may be employed in the practice of this invention are the aliphatic, alicyclic, aromatic hydrocarbons, dialkyl ketones, dialkyl ethers, and halogenated hydrocarbons. These include the butanes, pentanes, hexanes, heptanes, octanes, nonanes, decanes, dodecanes, cyclopentane, cyclohexane, methylcyclohexane, benzene, toluene, acetone, methyl ethyl ketone, diethyl ether, diisopropyl ether, chloroform, carbon tetrachloride, methylchloroform, dichlorodifluoromethane, 1,1,2-trichloro-1,2,2-trifluoroethane, trichlorofluoromethane and perchloroethylene. The preferred solvents are the aliphatic, alicyclic and aromatic hydrocarbons. The solvents may be recycled through the process as many times as desired without any detrimental effects on the polyols.

The use of the solvents results in the recovery of additional polyol which previously was lost. Furthermore, the use of solvents improves the filtration rate due to a lower polyol viscosity. Additionally, the dry filter cake is readily removable from the filter screen leaving a clean surface which can be used for subsequent filtrations without washing the screen media. The amount of solvent employed will depend upon the capacity of the equipment. In general, a minimum of one filter volume is necessary to efficiently wash the system.

It will be obvious from the foregoing that various modifications of what has been specifically described may be utilized without departing from the invention as defined in the following claims.

The embodiments of the invention in which an exclusive property or privilege is claimed are defined as follows:

1. In the process for the removal of alkaline catalysts from crude polyoxyalkylene ether polyols selected from the group prepared by condensing ethylene oxide, propylene oxide, butylene oxide and mixtures thereof with compounds such as ethylene glycol, propylene glycol, water, dipropylene glycol, trimethylene glycol, 1,2-butanediol, 1,3-butanediol, 1,4-butanediol, hexanetriol, glycerol, trimethylolpropane, trimethylolethane, hydroquinone, pentaerythritol, alpha-methylglucoside, sorbitol, sucrose, ethylene diamine, diethylene triamine, toluene diamine, aniline, methylene dianiline, piperazine, triisopropanolamine and bisphenol A wherein said polyols have a molecular weight ranging from 300 to 26,000, prepared in a reactor the improvement comprising:

(a) stirring a mixture of water, synthetic magnesium silicate adsorbent, and said crude polyol at about 30° to about 120° C (b) spray washing, with solvent selected from the group consisting of aliphatic alicyclic and aromatic hydrocarbons, dialkyl ketones, dialkyl ethers, halogenated hydrocarbons and mixtures thereof, the reactor employed for the preparation of said crude polyol, (c) transferring said solvent to said mixture of step (a), (d) cycling said mixture of step (c) through a filter until sufficient filter cake is deposited on said filter and a catalyst free filtrate containing said polyol is obtained, (e) pumping a polyol filter heel through a catalyst scavenging system until a catalyst free polyol filter heel is obtained, and combining said catalyst free polyol filter heel with the polyol of step (d), (f) washing said filter with said solvent, (g) drying said filter cake, and (h) removing said solvent and said water from said catalyst free polyol.

2. The process of claim 1 wherein the mixture is stirred at a temperature from about 95° Centigrade to about 120° Centigrade.

3. The process of claim 2 wherein the mixture is stirred for at least 1 hour.

4. The process of claim 1 wherein the filter cake is dried with nitrogen gas.

5. The process of claim 1 wherein the adsorbent is synthetic magnesium silicate.

6. The process of claim 1 wherein the solvent of step (c) is transferred to said mixture in a hold tank.

7. The process of claim 1 wherein the solvent and water of step (h) are removed from the polyol by means of a flash stripper.

8. The process of claim 1 wherein the solvent is recovered employing a solvent recovery system.

* * * * *